(12) United States Patent
Lee et al.

(10) Patent No.: US 8,677,690 B2
(45) Date of Patent: Mar. 25, 2014

(54) FUEL DOOR OPENING/CLOSING APPARATUS FOR VEHICLE

(75) Inventors: Sang Hyun Lee, Jeju-si (KR); In Chan Kim, Busan (KR); Won Seok Oh, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 247 days.

(21) Appl. No.: 12/957,892

(22) Filed: Dec. 1, 2010

(65) Prior Publication Data

US 2012/0047807 A1 Mar. 1, 2012

(30) Foreign Application Priority Data

Aug. 31, 2010 (KR) ........................ 10-2010-0084498

(51) Int. Cl.
*E05F 11/00* (2006.01)

(52) U.S. Cl.
USPC ............................. 49/325; 49/324; 296/97.22

(58) Field of Classification Search
USPC ......... 49/324, 325, 349, 352, 348; 296/97.22; 220/86.2; 74/427, 5.5
See application file for complete search history.

(56) References Cited

U.S. PATENT DOCUMENTS

| | | | | |
|---|---|---|---|---|
| 4,316,476 | A | * | 2/1982 | Merges .......................... 132/253 |
| 4,706,512 | A | * | 11/1987 | McKernon et al. ............. 74/405 |
| 4,739,677 | A | * | 4/1988 | Kofink et al. .................... 74/625 |
| 4,921,288 | A | * | 5/1990 | Cifuentes et al. ............. 292/114 |
| 5,114,197 | A | * | 5/1992 | Persiani ...................... 292/336.3 |
| 5,368,363 | A | * | 11/1994 | Sakamoto ..................... 297/362 |
| 6,318,771 | B1 | * | 11/2001 | Holloway et al. ......... 292/341.16 |
| 6,530,175 | B2 | * | 3/2003 | Sato et al. ....................... 49/138 |
| 6,845,964 | B2 | * | 1/2005 | Ro ............................ 251/129.13 |
| 7,380,861 | B2 | | 6/2008 | Engel |
| 8,276,969 | B2 | * | 10/2012 | Franz .......................... 296/97.22 |
| 2005/0193630 | A1 | * | 9/2005 | Marshik et al. ................. 49/181 |
| 2006/0053920 | A1 | * | 3/2006 | Kawamura et al. ............. 74/425 |
| 2006/0053921 | A1 | * | 3/2006 | Kawamura et al. ............. 74/425 |
| 2008/0230147 | A1 | * | 9/2008 | Baudoux et al. .............. 141/349 |
| 2009/0126827 | A1 | * | 5/2009 | Guendouz et al. ............ 141/312 |
| 2009/0249698 | A1 | * | 10/2009 | Stenzel et al. ................... 49/325 |
| 2011/0140477 | A1 | * | 6/2011 | Mihai ........................ 296/97.22 |
| 2011/0306223 | A1 | * | 12/2011 | Bauer ............................ 439/136 |
| 2012/0138394 | A1 | * | 6/2012 | Park et al. ................. 188/1.11 E |
| 2012/0145512 | A1 | * | 6/2012 | Kim et al. ................... 192/219.5 |

FOREIGN PATENT DOCUMENTS

| | | |
|---|---|---|
| JP | 2-96072 A | 4/1990 |
| KR | 10-0444438 B1 | 10/2004 |
| KR | 1020050113959 (A) | 12/2005 |
| KR | 10-0828419 B1 | 5/2008 |
| KR | 10-0899974 B1 | 5/2009 |
| KR | 100899974 (B1) | 5/2009 |

* cited by examiner

*Primary Examiner* — Katherine Mitchell
*Assistant Examiner* — Shiref Mekhaeil
(74) *Attorney, Agent, or Firm* — Morgan, Lewis & Bockius LLP

(57) ABSTRACT

A fuel door opening/closing apparatus for a vehicle is configured to lock and release a fuel door for opening and closing an oil filling opening of the vehicle. The fuel door opening/closing apparatus for a vehicle includes a housing mounted to a hinge of a fuel door rotatably mounted to a fuel door housing, a motor installed within the housing, a locking rod configured to be moved between a locking position for locking the fuel door and a releasing position for releasing a locked state of the fuel door, and a power transmission configured to receive power of the motor, convert rotation of the motor to linear movement, and transmit the linear movement to the locking rod.

11 Claims, 13 Drawing Sheets

FUEL DOOR OPENING/CLOSING APPARATUS FOR VEHICLE

CROSS-REFERENCE TO RELATED APPLICATION

This application claims under 35 U.S.C. §119(a) the benefit of Korean Patent Application No. 10-2010-0084498 filed Aug. 31, 2010, the entire contents of which application is incorporated herein for all purposes by this reference.

BACKGROUND

1. Technical Field

The present disclosure relates to a fuel door opening/closing apparatus for a vehicle. More particularly, it relates to a fuel door opening/closing apparatus for a vehicle that is configured to lock and release a fuel door for opening and closing an oil filling opening of the vehicle.

2. Background Art

A fuel door, which is often positioned at a rear portion of a vehicle's body, is usually configured to be open in a pop-up manner by control of a driver in a passenger's compartment using an opening lever or switch without using a key.

FIG. 1 shows a conventional fuel door for a vehicle installed at the rear portion of the vehicle. FIGS. 2(a) and (b) illustrates an actuator of a conventional fuel door opening/closing apparatus for a vehicle and a mounting structure thereof.

As illustrated in FIGS. 1 and 2, in the conventional fuel door opening/closing apparatus for a vehicle, an actuator 30 is installed to a fuel door housing 50, at the front portion of a locking part, by means of a mounting bracket 20. A locking rod 40 operably coupled to the actuator 30 serves to lock and release the fuel door 10 while moving forward and rearward.

The actuator 30 includes a housing 31 mounted to a fuel door housing 50, a motor 32 installed within the housing 31, and a power transmission for moving the locking rod 40 engaged with or released from the fuel door 10.

The power transmission receives power from the motor 32 and moves the locking rod 40 between a locking position and a releasing position. To achieve this, the power transmission includes a first spur gear 33 connected to a shaft of the motor 32, a second spur gear 34 engaged with the first spur gear 33, a screw-shaped connecting gear 35 connected to the second spur gear 34, and a worm gear 36 coupled to the locking rod 40, so as to push or pull the locking rod 40.

In the conventional fuel door opening/closing apparatus, a time lag takes place in the operation thereof while the power from the motor 32 is transmitted to the locking rod 40. Namely, there would be an delay in the operation since the power transmission is subjected to several elements, such as the first spur gear 33 of a small radius, the second spur gear 34 of a large radius, the connecting gear 35 and the worm gear 36, which also leads to increase of noise.

As an operating time of the actuator 30 increases, quality and durability of the gear members of the actuator 30 are continuously degraded due to wear and damage of teeth of the gear members.

As illustrated in FIG. 3, when the locking rod 40 is locked and released, the work gear 36 directly strikes a stopper 37 of the housing 31, causing loud striking noise. Further, the contact surface of the housing 31 is worn by the friction between an end of the worm gear 36 and the housing 31 (for example, the stopper), whereby the durability of the housing 31 is deteriorated. Further, the distance between shafts of the connecting gear 35 and the worm gear 36 might get apart from each other, making it impossible to operate them in a certain section.

Furthermore, in case where the distance between the actuator 30 and the locking position of the locking rod 40 is widened, the locking rod 40 may go through excessive lateral movements (perpendicular to an axis direction) during the locking and releasing operations of the locking rod 40, whereby reliability in operation of the locking rod 40 is deteriorated.

The information disclosed in this Background section is only for enhancement of understanding of the general background of the invention and should not be taken as an acknowledgement or any form of suggestion that this information forms the prior art already known to a person skilled in the art.

BRIEF SUMMARY

The present invention has been made in an effort to solve the above-described problems associated with prior art, and various aspects of the present invention provide a fuel door opening/closing apparatus for a vehicle in which an actuator configured to operate a locking rod for locking and releasing a fuel door is integrally installed in a fuel door, thereby shortening the operation time of the actuator, reducing noise, and preventing the actuator from being worn out.

In one aspect, the present invention provides a fuel door opening/closing apparatus for a vehicle including a housing mounted to a hinge of a fuel door rotatably mounted to a fuel door housing, a motor installed within the housing, a locking rod configured to be moved between a locking position for locking the fuel door and a releasing position for releasing a locked state of the fuel door, and a power transmission configured to receive power of the motor, convert rotation of the motor to linear movement, and transmit the linear movement to the locking rod.

The power transmission may include a worm gear shaft-coupled to the motor, a complex gear having a helical gear enmeshed with the worm gear to be rotated and a spur gear integrally formed with an upper end of the helical gear to be rotated together with the helical gear concentrically, and a rack gear enmeshed with the spur gear to be moved along an imaginary line parallel to the movement direction of the locking rod.

A stopper may be fixed to the housing under the complex gear to stop rotation of the complex gear with a step on the bottom surface of the complex gear.

An air pocket may be formed in the stopper to prevent noise from being generated when the complex gear is stopped by the stopper.

The stopper may be made of polyethylene to absorb an impact when it collides with the complex gear.

A guide panel for guiding linear movement of the rack gear in a guide groove of the housing may be formed in a guide portion of the rack gear.

A coupling guide for coupling with the locking rod may be mounted to a coupling portion of the rack gear and a rotation preventing recess for preventing rotation of the locking rod may be formed in the coupling guide.

A boss passing through a boss through-hole of the locking rod may be installed in the fuel door housing and a guide hole through which a guide rib of the locking rod passes through is formed in the boss to guide movement of the locking rod.

A holder for preventing an end of the worm gear from being worn out may be inserted into the housing.

According to the present invention, since a actuator is integrally formed with a hinge of a fuel door, a separate mounting member such as a mounting bracket for installing the actuator is not necessary.

Further, since the actuator is held and supported on a fuel door housing or the hinge of the fuel door, a separate assembling process is not necessary.

Furthermore, since the operation time for transmitting power of a motor to a locking rod by a power transmission is shortened, operation noise of the power transmission can be reduced and can be realized with a simple tone.

In addition, since a direct strike to a housing is avoided, wear of the housing due to friction can be prevented and the durability of the housing can be improved.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Figure 1:
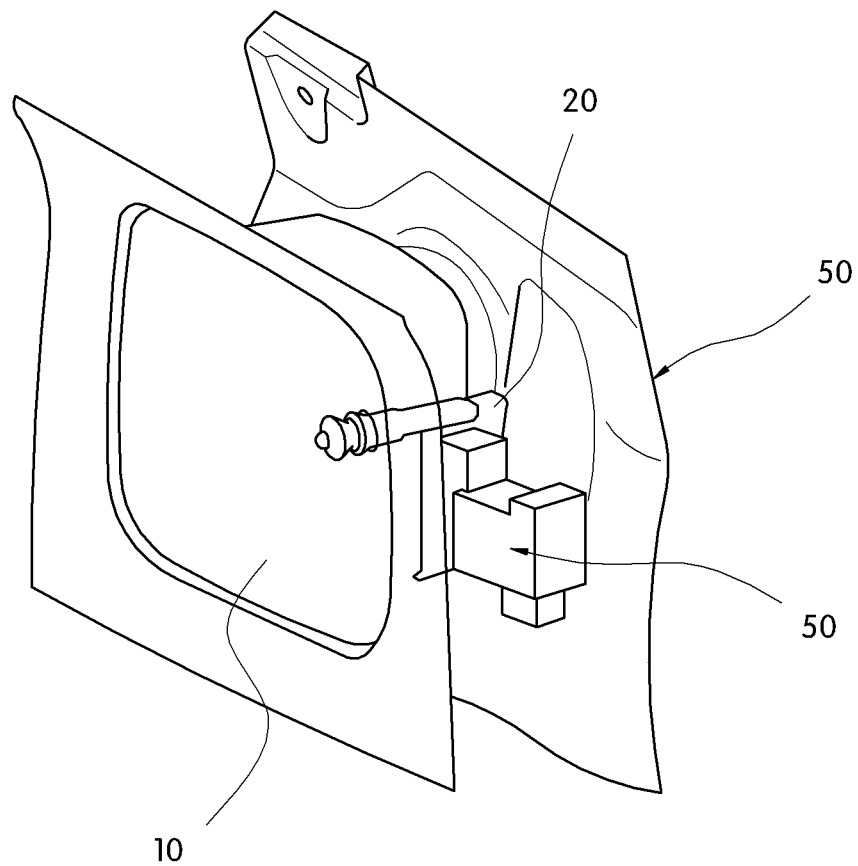
FIG. 1 is a view illustrating a conventional fuel door for a vehicle installed at the rear side of the vehicle.
Figure 2:
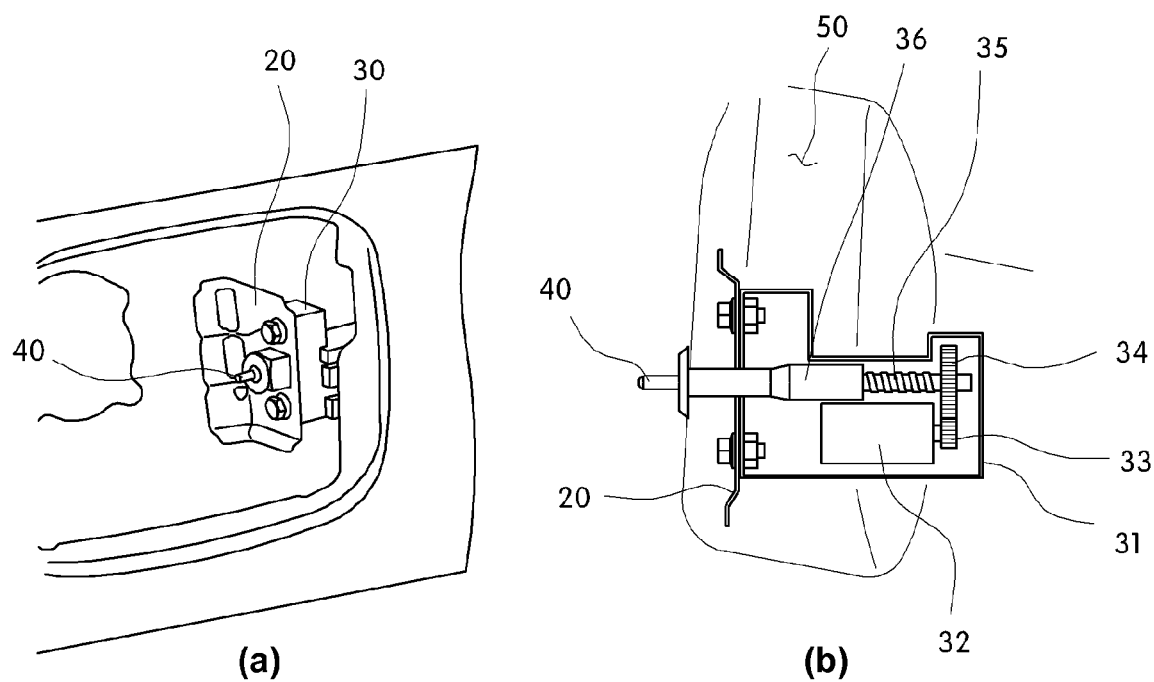
FIGS. 2(a) and 2(b) illustrate an actuator of a conventional fuel door opening/closing apparatus for a vehicle and a mounting structure thereof.
Figure 3:
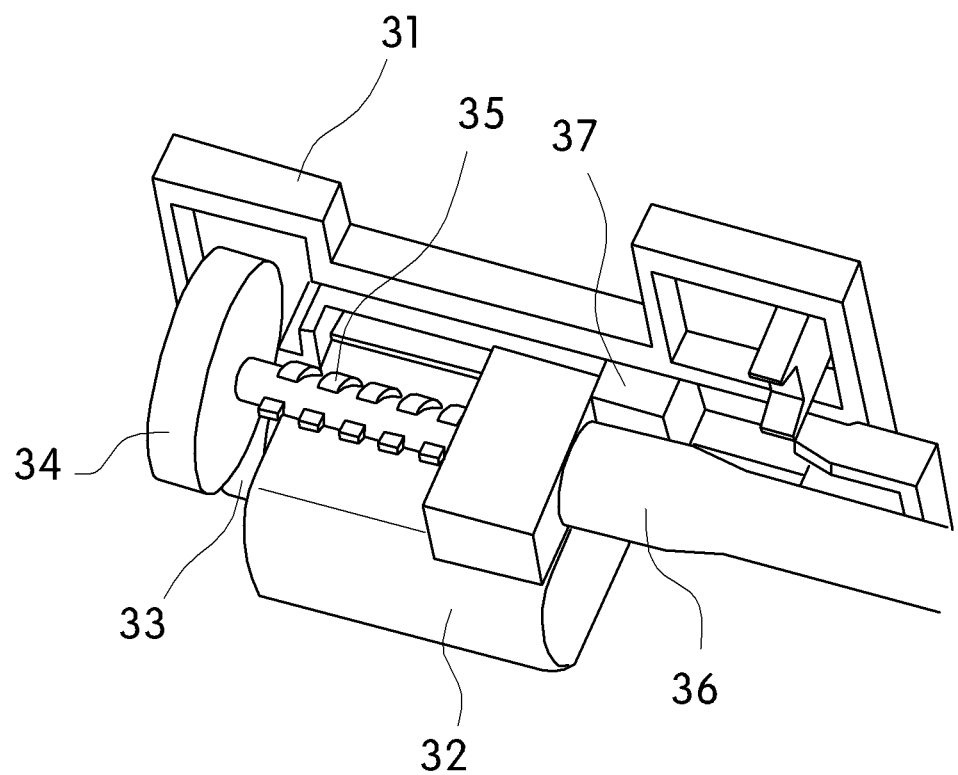
FIG. 3 is a view for describing a problem of the conventional fuel door opening/closing apparatus for a vehicle.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a fuel door opening/closing apparatus of a vehicle for locking or releasing a fuel door, and can shorten the operation time period of an actuator integrally mounted to the fuel door, can reduce noise, and can improve durability.

Hereinafter, various embodiments of the present invention will be described below in detail with reference to the accompanying drawings such that those skilled in the art to which the present invention pertains can easily practice the present invention.

A fuel door 100 opened and closed to supply a fuel is installed in a body of a vehicle, and a hinge 110 of the fuel door 100 is rotatably mounted to a fuel door housing 200 having an oil filling opening.

An actuator 300 is mounted onto an upper portion of the hinge 110, i.e. a fuel door housing 200 to operate a locking rod 400 that linearly moves to lock or release the fuel door 100.

In the present invention, the actuator 300 is not coupled with and fixed to the hinge 100 but is positioned and held on an upper portion of the hinge 110.

For this purpose, holding means for stably holding the actuator 300 (or housing) is formed at one side of the fuel door housing 200.

Figure 5:
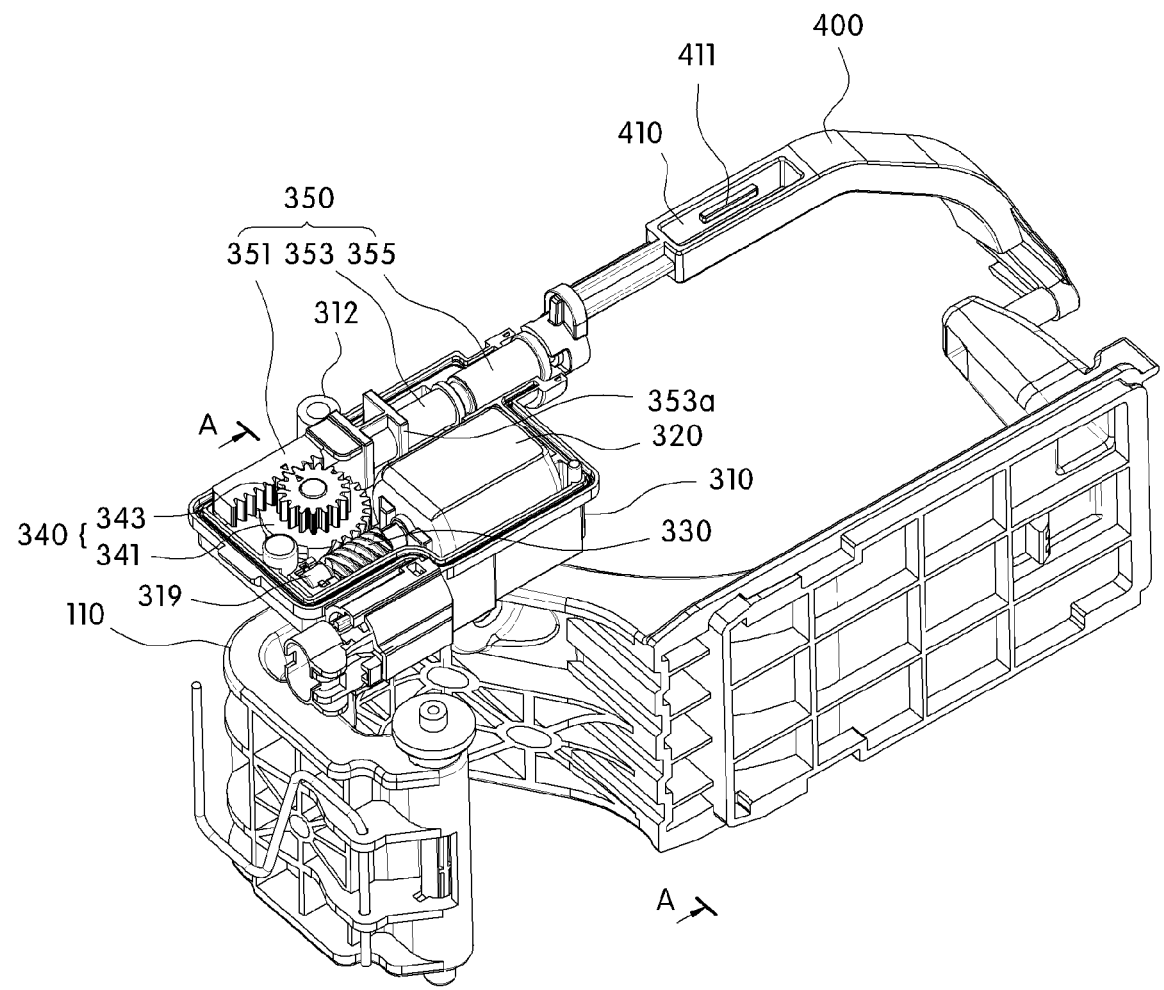
FIG. 5 is a perspective view illustrating an exemplary actuator according to the present invention.

As illustrated in FIG. 5, a first holding member 201, a second holding member 202, and a third holding member 203 are formed as the holding means on the left, upper, and right sides of the fuel door housing 200 at an upper portion of the hinge 100, a first held portion 311, a second held portion 312, and a third held portion 313 are formed as held means on the left, upper, and right sides of the housing 310 of the actuator 300 in correspondence to the holding means of the fuel door housing 200.

The first held portion 311 passes through a hole of the first holding member 201, the second held portion 312 is interference-fitted into the second holding member 202, and the third held portion 313 is positioned on the third holding member 203, whereby they are prevented from moving all directions (forward, rearward, upward, downward, rightward, and leftward)

In this way, the actuator 300 is supported and held by the holding means of the fuel door housing 200 and can be stably mounted on the fuel door housing 200 without any separate mounting member or assembling process.

Meanwhile, the actuator 300 integrally formed with the fuel door 100 includes the housing 310, a motor 320 mounted into the housing 310, and a power transmission for transmitting the power of the motor 320 to a locking rod 400.

The power transmission converts linear movement generated by the power of the motor 320 into linear movement to transmit it to the locking rod 400 such that the locking rod 400 can be moved between a locking position for locking the fuel door 100 and a releasing position for releasing the fuel door 100.

That is, the power transmission receives the power of the motor 320 and moves the locking rod 400 between the locking position and the releasing position.

The power transmission includes a worm gear 330 shaft-coupled to the motor 320, a complex gear enmeshed with the worm gear 330 to be rotated and configured to transmit the power of the motor 320 transmitted through the worm gear 330 to a rack gear 350, and the rack gear 350 configured to be moved along an imaginary line parallel to the movement direction of the locking rod 400 by the complex gear 340.

The complex gear 340 includes a helical gear 341 enmeshed with the worm gear 330 to be rotated and a spur gear 343 integrally formed with an upper end of the helical gear 341 to be rotated with the helical gear 341 concentrically. One will appreciate that the spur gear and the helical gear may be monolithically formed.

The rack gear 350 is enmeshed with the spur gear 343 to be linearly moved with it being located at an upper end of the helical gear 341 and the height of the actuator 300 is reduced by integrally forming the helical gear 341 and the spur gear 343 as the complex gear 340.

As the height of the actuator 300 is reduced, the actuator 300 can be mounted on the upper surface of the fuel door housing 200.

The locking rod 400 coupled to an end of the rack gear 350 can be moved between a locking position for locking the fuel door 100 with the oil filling opening being closed and a releasing position for releasing the locked state of the fuel door 100.

Figure 6:
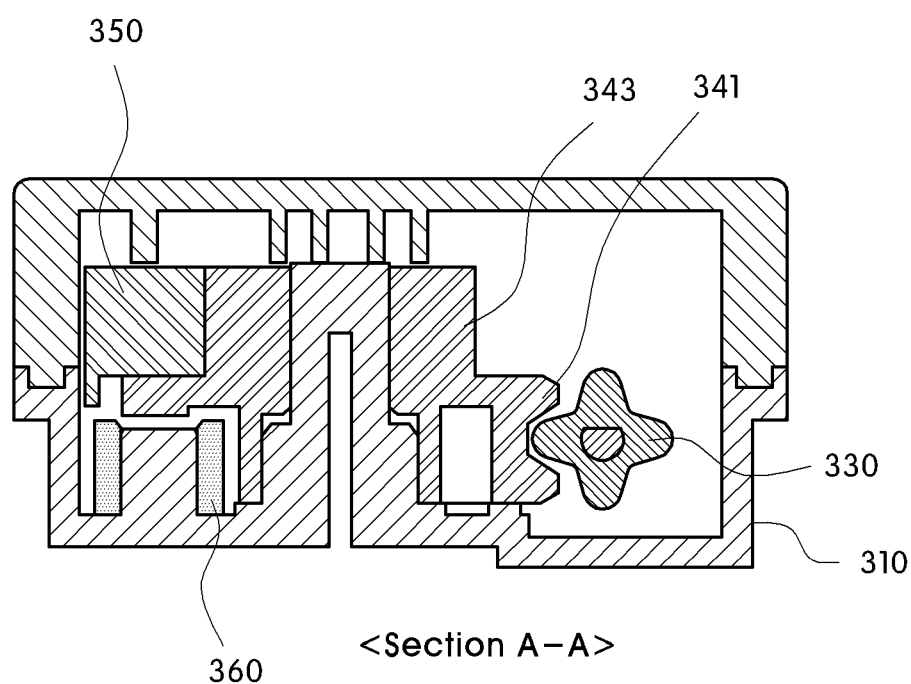
FIG. 6 is a sectional view taken along line A-A of FIG. 5.
Figure 7A:
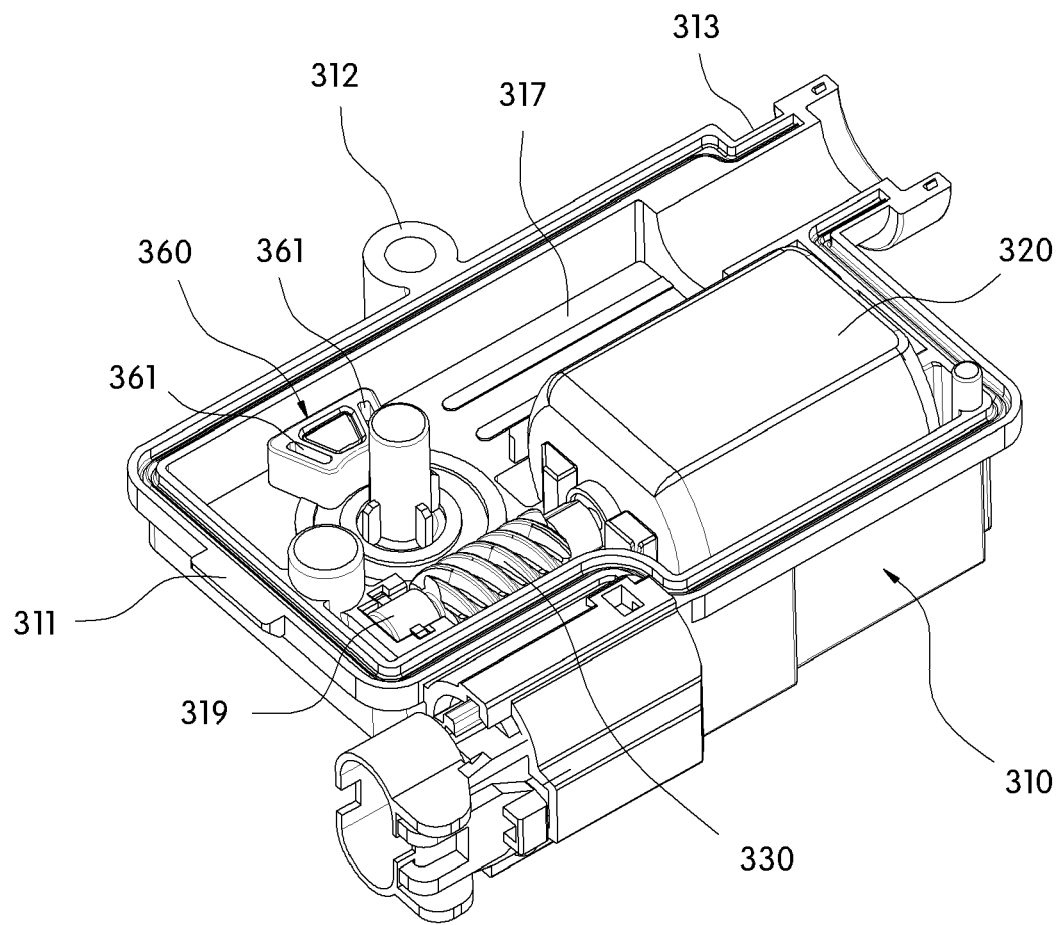
FIGS. 7a and 7b are views illustrating an exemplary stopper mounting structure according to the present invention.
Figure 7B:
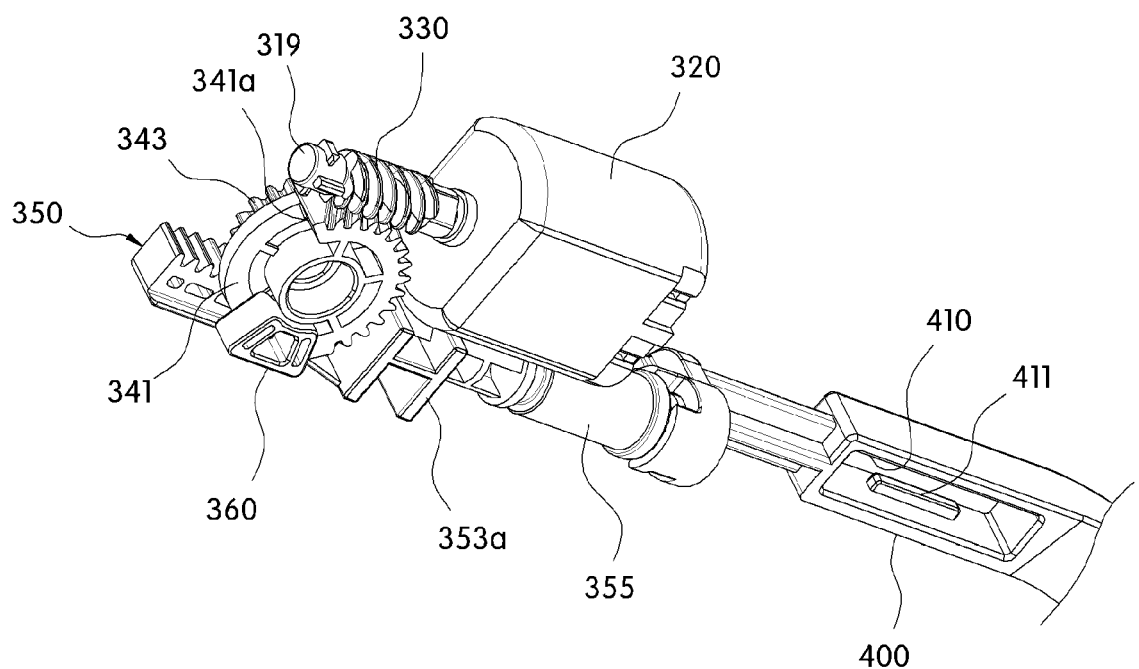

As illustrated in FIGS. 6, 7a, and 7b, a stopper 360 fixed to the bottom surface of the housing 310 is installed under the complex gear 340 (that is, on the lower side of the helical gear 341).

As illustrated in FIG. 6, the stopper 360 is fixed by inserting a protrusion on the bottom surface of the housing 310 into a central portion of the stopper 360 to function to stop rotation of the complex gear 340 by a step 341a on the bottom surface of the complex gear 340. To achieve this, the step 341a having a shape configured to stop rotation by the stopper 360 is formed on the bottom surface of the helical gear 341.

Approximately half the periphery of the helical gear 341 has a gear shape, and the remaining portion has a flat shape such that ends of the gear shape has stepped portions by which the step 341a is formed on the bottom surface of the helical gear 341.

That is, stepped portions are formed between the gear shape and the flat shape of the helical gear 341 on the bottom surface thereof, and the step 341a collides with the stopper 360 during rotation of the helical gear 341 to stop rotation of the helical gear 341 (i.e. the complex gear 340).

Air pockets 361 are formed on the right and left sides of the stopper 360 to prevent noise from being generated when the complex gear 340 is stopped by the stopper 360.

The stopper 360 is made of polyethylene to absorb an impact when it collides with the complex gear 340 and reduce the striking sound when it collides with the helical gear 341. One will appreciate that the stopper may be made of other suitable materials which absorb impact and lessen noise.

The rack gear 350 may be classified into a gear portion 351, a guide portion 353, and a coupling portion 355 from the left side to the right side of FIG. 5.

In the gear portion 351, saw-teeth enmeshed with the spur gear 343 are formed to linearly move the rack gear 350.

Figure 8:
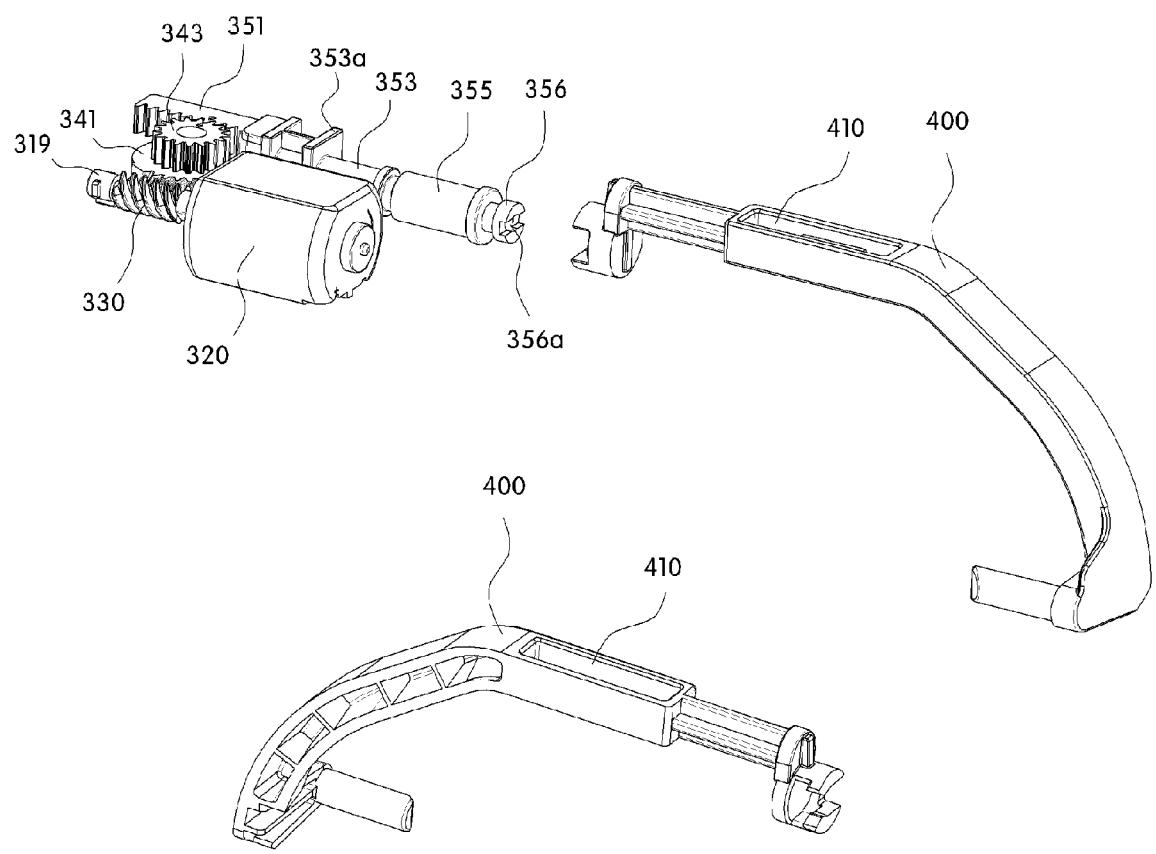
FIG. 8 is a view illustrating an exemplary coupling of a rack gear and a locking rod according to the present invention.

The guide portion 353 guides the linear movement of the rack gear 350, and as illustrated in FIG. 8, a guide panel 353a for guiding the linear movement of the rack gear 350 in a guide groove 317 of the housing 310 is formed in the guide portion 353.

The guide panel 353a contacts with the guide groove 317 of the housing 310 to linearly move the rack gear 350 without causing movement (or shaking) of the rack gear 350.

The coupling portion 355 is coupled to the locking rod 400, and a coupling guide 356 for coupling of the locking rod 400 is mounted to an end of the coupling portion 355. A rotation preventing recess 356a is formed in the coupling guide 356 to prevent rotation of the locking rod 400.

In more detail, a portion of the coupling guide 356 which protrudes to the outside of the coupling portion 355 of the rack gear 350 has a T-shaped cross-section like a bolt, and an end of the locking rod 400 may be interference-fitted into the T-shape portion of the coupling guide 356 laterally.

A protrusion fitted into the rotation preventing recess 356a is formed at an end of the locking rod 400.

Figure 4A:
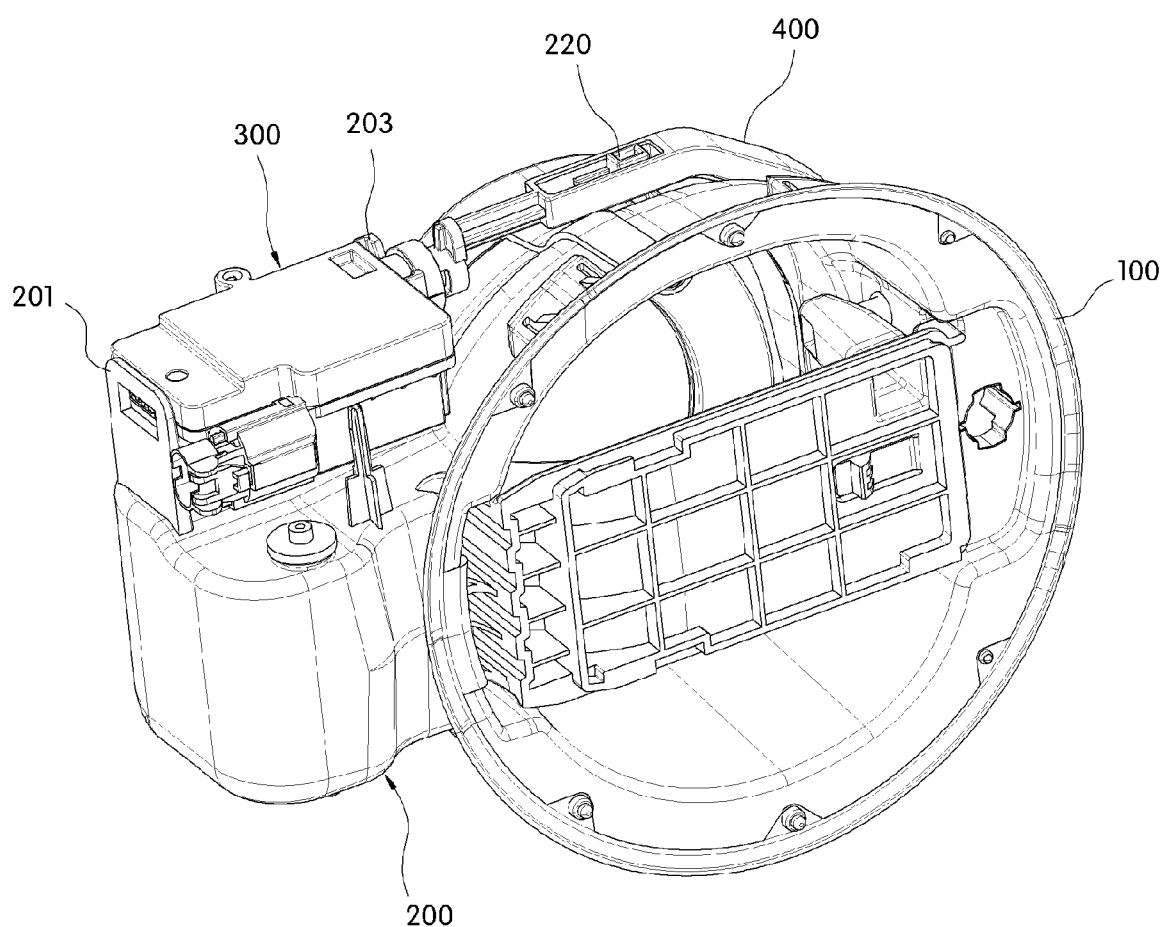
FIGS. 4a and 4b are perspective views illustrating an exemplary fuel door opening/closing apparatus for a vehicle according to the present invention.
Figure 4B:
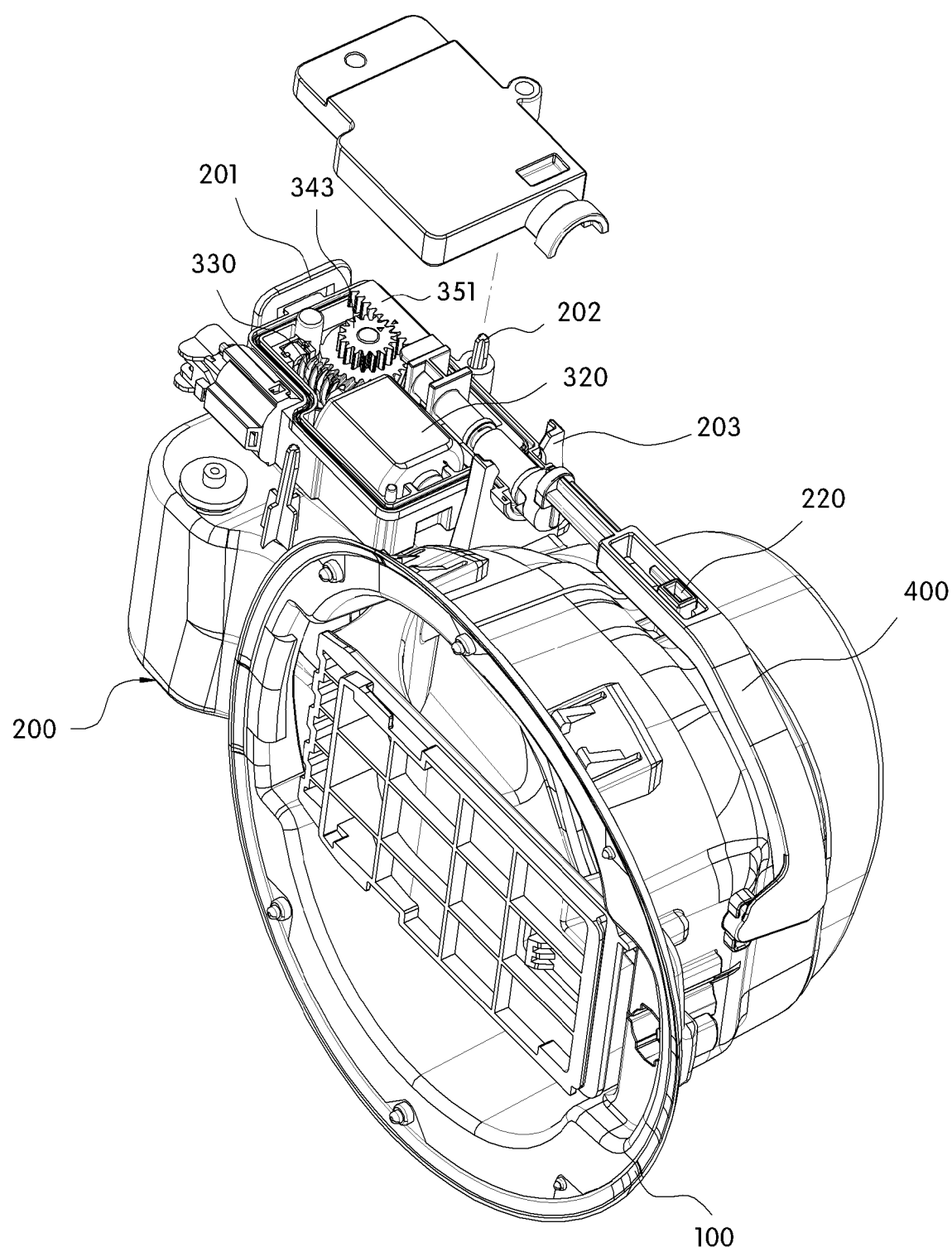
Figure 9:
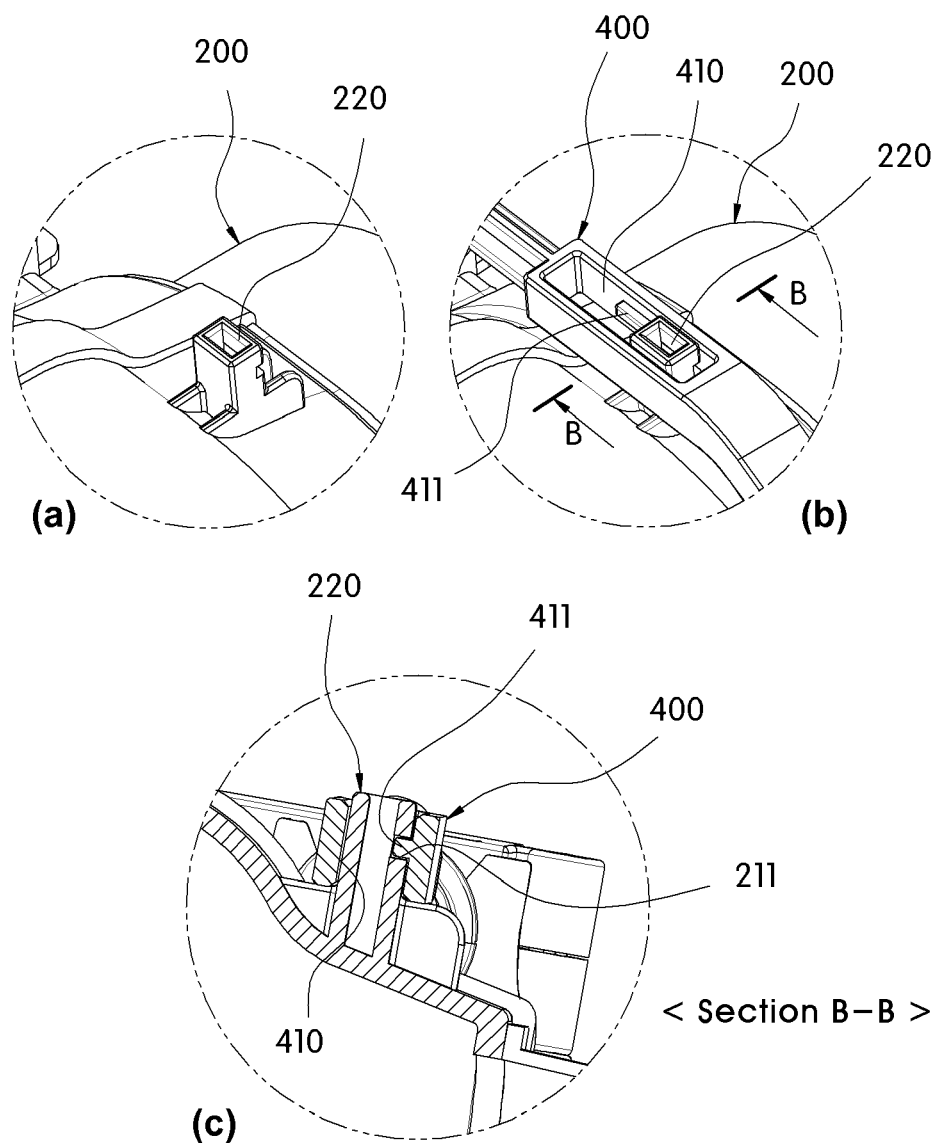
FIGS. 9(a), 9(b) and 9(c) illustrate an exemplary main portion of the locking rod according to the present invention.

As illustrated in FIGS. 4a, 4b, and 9, a boss 220 protruding toward the locking rod 400 is installed at an upper end of the fuel door housing 200, a boss through-hole 410 through which the boss 220 is inserted is formed in the locking rod 400, and a guide rib 411 protrudes into the boss through-hole 410.

A guide hole 221 through which the guide rib 411 of the locking rod 400 is inserted is formed in the boss 220 which prevents movement of the locking rod 400 in directions other than the movement direction of the locking rod 400 while guiding the linear movement of the locking rod 400.

Figure 10:
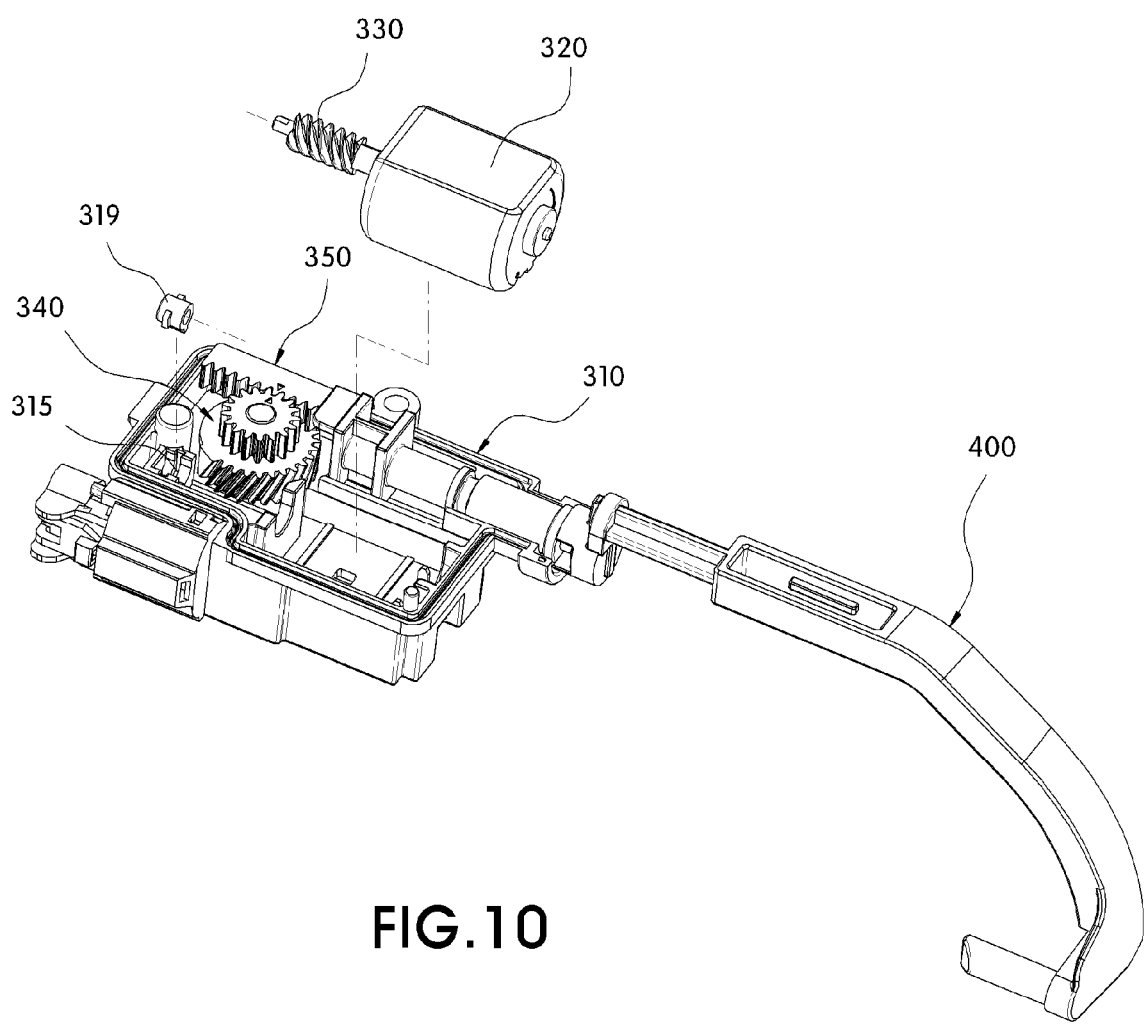
FIG. 10 is a view illustrating an exemplary holder mounting structure according to the present invention.

As illustrated in FIG. 10, a holder for preventing an end of the worm gear 330 being worn out is inserted into the housing 310.

For this purpose, an insert hole 315 for stably inserting the holder 319 into the bottom surface of the housing 310 is formed in the housing 310, and the holder 319 is installed in the insert hole 315 and has a shape corresponding to the insert hole 315 to be maintained inserted into the insert hole 315 without being separated by rotation of the worm gear 330.

The holder 319 is made of a plastic, e.g. polyacetal, and an end of the worm gear 330 is rotatably inserted into the holder 319. One will appreciate that the holder may be formed of other suitable materials.

The holder 319 can restrain the actuator 300 being worn out during the operation thereof and improve the durability of the actuator 300.

Figure 11:
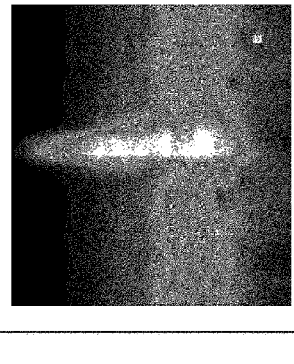
FIG. 11 illustrates graphs sounds generated when a conventional actuator and an actuator according to the embodiment of the present invention are operated to lock and release a fuel door respectively.

FIG. 11 illustrates graphs sounds generated when a conventional actuator and an actuator according to various embodiments of the present invention are operated to lock and release a fuel door respectively. It can be seen from FIG. 11 that the operation sound generated during the operation of the actuator 300 according to the present invention is reduced by approximately 3.7 to 10 dB as compared with the operation sound generated during the operation of a conventional actuator, whereby the tone of the operation sound becomes simple and soft.

Hereinafter, the operation of various embodiments of the present invention will be described.

First, when the fuel door 100 is to be opened, if a signal is transmitted to a control unit by the operation of the driver and a voltage is applied to the motor 320 in response to the control signal of the control unit, the motor 320 is driven to rotate the worm gear 330 which in turn rotates the helical gear 341 to rotate the complex gear 340.

Then, the spur gear 343 of the complex gear 340 is rotated together with the helical gear 341 concentrically to transmit power to the rack gear 350, which in turn is linearly moved to operate the locking rod 400 coupled to an end of the rack gear 350.

Then, the locking rod 400 is moved to the releasing position with the guide rib 411 being inserted into the guide hole 211, without being moved in other directions.

When the locking rod 400 is located in the releasing position, the locking state of the fuel door 100 is released and the fuel door 100 is rotated with respect to the fuel door housing 200 to open the oil filling opening.

In addition, when the fuel door 100 is to be closed and locked, the power transmission of the actuator 300 is operated in the opposite direction to move the locking rod 400 to the locking position.

For convenience in explanation and accurate definition in the appended claims, the terms "left" or "right", "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel door opening and closing apparatus for a vehicle comprising:
    a fuel door housing including a hinge axis;
    a fuel door including a hinge portion rotatably mounted to the fuel door housing about the hinge axis;
    a motor mounted to the fuel door housing adjacent the hinge axis;
    a locking rod configured to be moved between a locking position for locking the fuel door to the fuel door housing and a releasing position for unlocking the fuel door from the fuel door housing; and
    a power transmission operably coupling the motor and the locking rod and configured to receive power from the motor, convert rotation of the motor to linear movement, and transmit the linear movement to the locking rod;
    wherein the fuel door rotates with respect to the hinge axis when disengaged from the locking rod by the linear movement of the locking rod to the releasing portion; and
    wherein the power transmission is positioned between the motor and the locking rod and spaced from the hinge axis;
    wherein a stopper is fixed to the housing of the power transmission under a complex gear and stops rotation of the complex gear by engaging with a step formed on a bottom surface of the complex gear; and
    wherein an air pocket is formed in the stopper to prevent noise from being generated when the complex gear is impacted by the stopper.

2. The fuel door opening and closing apparatus of claim 1, wherein the power transmission includes:
    a housing into which the motor is installed;
    a worm gear operably coupled to the motor;
    a complex gear having a helical gear rotatably engaged with the worm gear; and
    a spur gear concentrically formed with an upper end of the helical gear to be rotated together with the helical gear; and
    a rack gear engaged with the spur gear to be moved along an imaginary line parallel to a movement direction of the locking rod.

3. The fuel door opening and closing apparatus of claim 1, wherein the stopper is made of polyethylene to absorb an impact when it collides with the complex gear.

4. The fuel door opening and closing apparatus of claim 1, wherein a guide panel for guiding linear movement of the rack gear in a guide groove in the housing of the power transmission is formed in a guide portion of the rack gear.

5. The fuel door opening and closing apparatus of claim 1, wherein a coupling guide for coupling with the locking rod is mounted to a coupling portion of the rack gear and a rotation preventing recess for preventing rotation of the locking rod is formed in the coupling guide, and
    wherein an end of the locking rod includes a boss to which the rotation preventing recess of the coupling guide is engaged.

6. The fuel door opening and closing apparatus of claim 1, wherein a boss passing through a boss through-hole of the locking rod is installed in the fuel door housing and a guide hole through which a guide rib of the locking rod passes through is formed in the boss to guide movement of the locking rod.

7. The fuel door opening and closing apparatus of claim 1, wherein a holder for preventing an end of a worm gear from being worn out is inserted into a housing of the power transmission.

8. The fuel door opening and closing apparatus of claim 1, wherein the spur gear is monolithically formed on the upper end of the helical gear.

9. A fuel door opening and closing apparatus for a vehicle comprising:
    a fuel door housing including a hinge axis;
    a fuel door including a hinge portion rotatably mounted to the fuel door housing about the hinge axis;
    a motor mounted to the fuel door housing adjacent the hinge axis;
    a locking rod configured to be moved between a locking position for locking the fuel door to the fuel door housing and a releasing position for unlocking the fuel door from the fuel door housing; and
    a power transmission operably coupling the motor and the locking rod and configured to receive power from the motor, convert rotation of the motor to linear movement, and transmit the linear movement to the locking rod;
    wherein the fuel door rotates with respect to the hinge axis when disengaged from the locking rod by the linear movement of the locking rod to the releasing portion;
    wherein the power transmission is spaced from the hinge axis;
    wherein holding means are formed at one side of the fuel door to stably hold the power transmission,
    wherein a stopper is fixed to the housing of the power transmission under a complex gear and stops rotation of the complex gear by engaging with a step formed on a bottom surface of the complex gear, and
    wherein an air pocket is formed in the stopper to prevent noise from being generated when the complex gear is impacted by the stopper.

10. The fuel door opening and closing apparatus for the vehicle according to claim 9, wherein the holding means includes:
    a first holding member, a second holding member, and a third holding member that are formed on left, upper, and right sides of the fuel door housing at an upper portion of the hinge portion; and
    a first held portion, a second held portion, and a third held portion are formed on left, upper, and right sides of a housing of the power transmission in correspondence to the first holding member, the second holding member, and the third holding member of the fuel door housing.

11. The fuel door opening and closing apparatus for the vehicle according to claim 9, wherein the holding means includes:
    a first held portion, a second held portion, and a third held portion which are formed on left, upper, and right sides of a housing of the power transmission.

* * * * *